(12) United States Patent
Mahr et al.

(10) Patent No.: US 7,586,817 B2
(45) Date of Patent: Sep. 8, 2009

(54) APPLIANCE FOR RECORDING OR PLAYING BACK INFORMATION HAVING MEANS FOR DETECTING OR MOVING THE SCANNING LOCATION ON A DISC WITH A WOBBLE TRACK

(75) Inventors: Peter Mahr, Zell im Wiesental (DE); Michael Huonker, Rosenfeld-Isingen (DE)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 10/496,527

(22) PCT Filed: Aug. 29, 2002

(86) PCT No.: PCT/EP02/09618

§ 371 (c)(1),
(2), (4) Date: May 21, 2004

(87) PCT Pub. No.: WO03/044780

PCT Pub. Date: May 30, 2003

(65) Prior Publication Data

US 2005/0073922 A1    Apr. 7, 2005

(30) Foreign Application Priority Data

Nov. 23, 2001 (DE) .............................. 101 57 332

(51) Int. Cl.
*G11B 7/00* (2006.01)
(52) U.S. Cl. .................................. 369/44.28
(58) Field of Classification Search ............... 369/47.1, 369/44.13, 275.3, 44.26, 47.38, 47.39, 47.4, 369/47.27, 53.22, 47.28, 47.49, 47.48, 47.32, 369/44.27, 44.28, 44.29
See application file for complete search history.

(56) References Cited

U.S. PATENT DOCUMENTS 4,067,044 A    1/1978   Maeda et al. ............... 358/128

(Continued)

FOREIGN PATENT DOCUMENTS

EP    265984    5/1988

(Continued)

OTHER PUBLICATIONS

Search report dated Jul. 7, 3003.

(Continued)

*Primary Examiner*—Nabil Z Hindi
(74) *Attorney, Agent, or Firm*—Robert D. Shedd; Harvey D. Fried; Patricia Verlangieri

(57) ABSTRACT

The invention proposes an appliance for recording or playing back information having means for detecting or moving the position of a scanning device over a disc with a wobble track, said appliance being able to be used both in recorded and in unrecorded areas of the disc and hence being able to be used both for write-once and for rewriteable recording media with a wobble track, and said appliance additionally permitting fast determination of the scanning location without decoding of scanned-location information which is contained in the wobble track. According to the invention, a wobble signal is scanned from the wobble track on the disc using a scanning device, and a wobble frequency contained in the wobble signal detected from the disc is used for detecting or moving the position of the scanning device. In this regard, the wobble frequency is related to the number of revolutions or the rotation speed of the disc or to a wobble frequency known for a reference location on the disc, which allows the position of the scanning device to be detected or moved without decoding of scanning-location information which is contained in the wobble signal. To generate the wobble frequency contained in the wobble signal, a circuit block is provided which contains a phase comparator, a bandpass filter, a voltage-controlled multivibrator and a digital phase shifter and is used to generate a wobble-frequency signal.

10 Claims, 8 Drawing Sheets

U.S. PATENT DOCUMENTS

Figure 1:
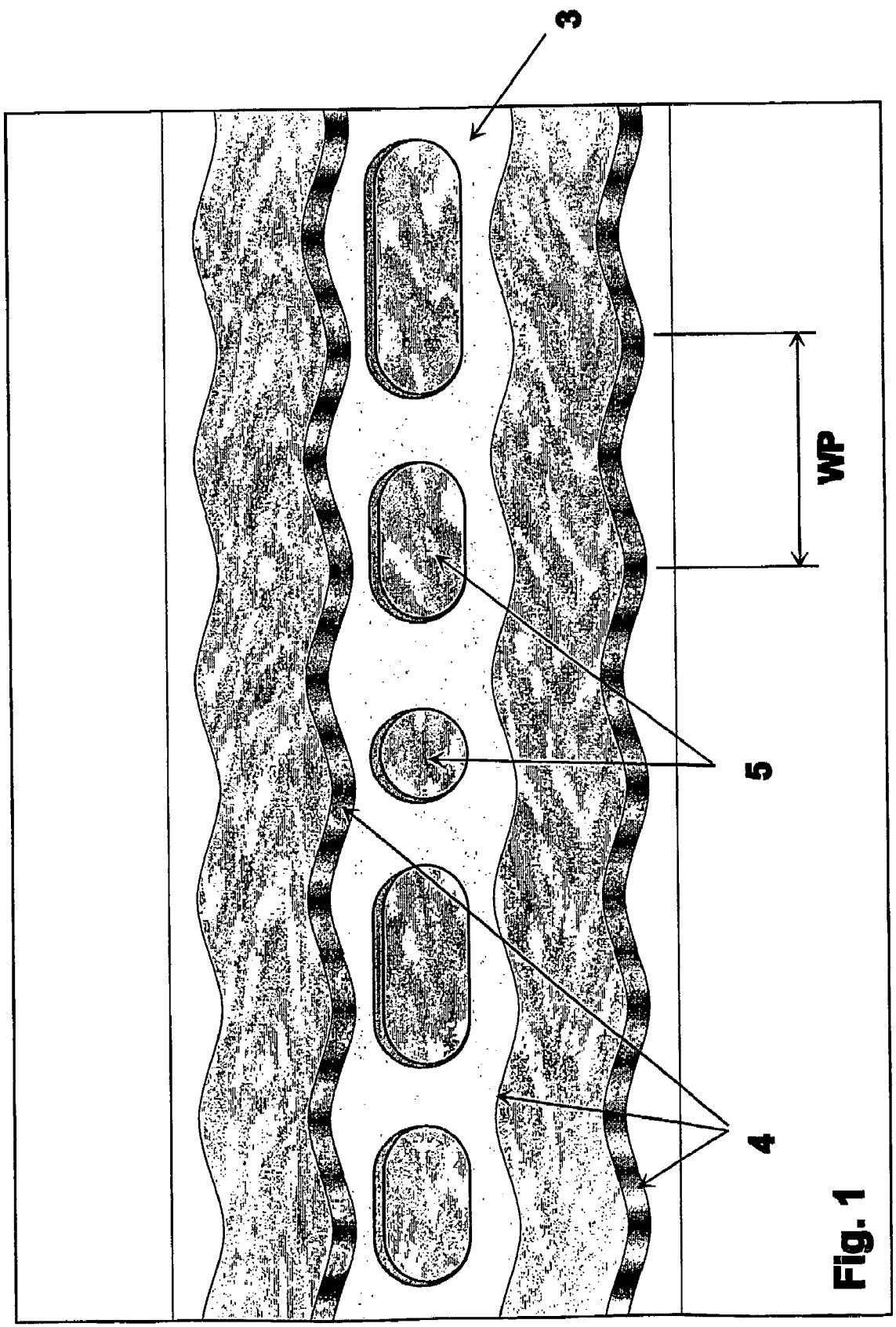

| | | | | |
|---|---|---|---|---|
| 5,495,465 A * | 2/1996 | Arisaka | ............ | 369/47.48 |
| 5,663,941 A * | 9/1997 | Aoshima | ............ | 369/44.34 |
| 5,703,851 A | 12/1997 | Ando | ............ | 369/47 |
| 5,835,478 A | 11/1998 | Kobayashi et al. | ............ | 369/275.3 |
| 5,974,013 A * | 10/1999 | Kadono | ............ | 369/47.49 |
| 6,172,954 B1 * | 1/2001 | Masuda | ............ | 369/47.26 |
| 6,201,778 B1 | 3/2001 | Sensyu | ............ | 369/59 |
| 6,201,784 B1 * | 3/2001 | Maeda | ............ | 369/59.25 |
| 6,236,629 B1 * | 5/2001 | Hisakado et al. | ............ | 369/47.32 |
| 6,721,251 B2 * | 4/2004 | Kojima et al. | ............ | 369/47.54 |
| 6,920,096 B2 * | 7/2005 | Tateishi | ............ | 369/47.48 |
| 7,345,977 B2 * | 3/2008 | Nobukuni et al. | ............ | 369/59.11 |

FOREIGN PATENT DOCUMENTS

| | | |
|---|---|---|
| EP | 930617 | 7/1999 |
| JP | 8-83458 | 3/1996 |
| JP | 2001-43614 | 2/2001 |
| WO | 01/01404 | 1/2001 |

OTHER PUBLICATIONS

ECMA Standard ECMA—337, $3^{rd}$ Edition, Dec. 2005, p. 31.

ATIP Wobble, http//:sirdavidguy.coolfreepages.com/ATIP_Wobble_Info.html.

* cited by examiner

APPLIANCE FOR RECORDING OR PLAYING BACK INFORMATION HAVING MEANS FOR DETECTING OR MOVING THE SCANNING LOCATION ON A DISC WITH A WOBBLE TRACK

This application claims the benefit, under 35 U.S.C. § 365 of International Application PCT/EP02/09618, filed Aug. 29, 2002, which was published in accordance with PCT Article 21(2) on May 30, 2003 in English and which claims the benefit of German patent application No. 10157332.4, filed Nov. 23, 2001.

The present invention relates to an appliance for recording or playing back information having means for detecting or moving the scanning location on a disc with a wobble track. The appliance has means for detecting or moving the scanning location of a scanning device over recorded and unrecorded areas of the disc, and is therefore suitable both for write-once and for rewriteable recording media with a wobble track and furthermore also permits detection of the current scanning location during track skipping.

Recording or playing back information which is stored or needs to be stored on a recording medium requires the scanning location to be detected and requires the scanning device used for scanning a recording medium to be moved. The scanning device used to record or play back the information is frequently also referred to as a pickup. Numerous methods for position determination or positioning for a scanning device are already known. Information about the scanning location is held on the recording medium, for example in the sector address or in the "cluster" information, which is stored either in the recorded information or in a wobbled information track. In the case of recording media with a wobble track, such as minidisc or DVD+RW, the information about the scanning location is generally held in the wobble track. The wobbling of the information track or recording track, which is also referred to as a pregroove, [lacuna] of the minidisc consists in frequency modulation. By contrast, the DVD+RW wobble track is phase-modulated. However, reading scanning-location information which is held in the wobble track as a result of modulation requires a relatively long period of time, since the scanning beam needs to be focused on the information track, and a number of control loops and a decoder need to be activated and aligned in succession for the purpose of reading information coded in the wobble track. Particularly following track skips or when the appliance has been turned on, orienting the scanning device towards the track on the recording medium requires a relatively long period of time before it is possible to start reading and decoding information stored on the disc. If, by way of example, it is found that a desired scanning or recording location has not been arrived at by counting tracks crossed, it is furthermore necessary to repeat the operation in order to position the laser beam in the correct sector or at the desired location. However, different recording and playback modes, and also starting after a pause mode, require a particularly fast and precise search operation in order to avoid data or information gaps during recording or playback. Focusing the scanning device and reading and decoding sector addresses or cluster information generally require too long a period of time to allow fast access to a desired recording or playback location on the disc or to ascertain the current position of the scanning device, however.

Another option for position determination for an optical scanning device is to use an additional optical encoder which generates signal pulses when the position of the optical scanning device changes, the number of said signal pulses allowing a change of location to be inferred. Such a system is known from U.S. Pat. No. 5,726,959, for example.

For DVD drives, however, the resolution and accuracy of such a method are not adequate. Furthermore, this allows only the relative change in the position of the optical scanning device to be determined, but not the scanning location on the disc.

In addition, by way of example, U.S. Pat. No. 5,920,526 discloses a method for detecting the boundary between a recorded and an unrecorded area on a writeable disc. In a first step, this involves first determining a rough area on the disc in which the sought boundary is situated, and then the rough area is halved in iterative steps until the sought boundary is situated, by way of example, within a maximum of four tracks. The accuracy and speed of this method are also not adequate for the demands placed on DVD drives.

It is therefore an object of the present invention to specify an appliance for recording or playing back information having means for detecting or moving the scanning location on a disc with a wobble track which allows the absolute position of the scanning device in relation to the recording medium to be detected or allows the scanning device to be positioned at a desired scanning location on the disc in a short time.

This object is achieved by means of features specified in independent patent claims. Other advantageous refinements and developments of the invention are specified in subclaims.

In accordance with one aspect of the invention, an appliance for recording or playing back data or information on a disc with a wobble track from the wobble track on the disc using a scanning device scans a wobble signal and uses a wobble frequency contained in the wobble signal detected from the disc to detect or move the position of the scanning device. The scanning-location information which is contained in the wobble signal as a result of modulation is not decoded, and the information about the scanning location is nevertheless made available with a high level of accuracy and in a comparatively short time.

To detect the absolute position of the scanning device in relation to the recording medium or to detect the scanning location on the disc with a wobble track, the unmodulated wobble frequency or the fundamental frequency of wobbling, which is referred to below as the wobble frequency, is filtered out of the wobble signal detected from the recording medium and is related to the rotation speed of the recording medium.

Since the wavelength or the distance of one period of the wobble track on the disc is standardized and is therefore known, the radius at which the recording or playback head is scanning the recording medium is ascertained by relating the product of wobble frequency and wavelength to the rotation speed of the recording medium using a constant factor. This then ascertains the absolute position of the scanning device on the recording medium or determines the scanning location on the disc.

To detect the position of the scanning device, the modulation of the spiralled recording track on the recording medium is thus used, said recording track being present on the recording medium anyway and normally being used to control the rotation speed or number of revolutions of the recording medium, to control the write operation on the recording medium and to evaluate sector addresses on the disc.

The advantages of the inventive method are very fast position determination without decoding of scanning-location information which is contained in the modulation of the wobble signal, and determination or detection of the absolute position of the optical scanning device. In addition, the inventive method can be used both in areas of the recording medium in which information has already been recorded and in areas of the recording medium in which no information has yet been written or stored on the recording medium. The wobble track is present on the disc both in recorded and in unrecorded areas and is therefore available for detecting the scanning location or for ascertaining the wobble frequency in unrecorded areas too.

In accordance with a second aspect of the present invention, this method is also used for positioning the scanning device at a desired radial position on the recording medium. To this end, a known, constant rotation speed at which the recording medium rotates is first assumed and the wobble frequency which can be expected at the desired scanning location or radius of the recording medium is calculated. The scanning device is then moved in the radial direction with respect to the recording medium until a match is achieved between the detected wobble frequency and the calculated wobble frequency. The rotation speed of the recording medium is ascertained either using the wobble frequency detected before skipping or using an additional detector. When a rotation-speed detector is used, it is furthermore also possible to permit or make changes to the rotation speed during track skipping by calculating a change in the wobble frequency which occurs as a result of changing the rotation speed.

To check whether the current position of the scanning device matches the desired position of the scanning device, the aforementioned method for detecting or determining the scanning location is additionally used.

A common feature of both methods is that a wobble frequency generated from the wobble signal detected from the recording medium is advantageously used to ascertain the position or to position a scanning device on the recording medium, and hence the scanned playback or recording location, a distance from a desired scanning location or a number of tracks needing to be crossed before the desired scanning location is determined without decoding of scanning-location information which is stored in the wobble track on the recording medium.

The wobble signal is a signal which is recorded at a constant linear speed in the wobble track on the disc with a prescribed wavelength. The wobble signal detected from a DVD+RW is phase-modulated, which means that a wobble frequency contained in the wobble signal can be detected in a much shorter time than information contained in the modulation of the wobble frequency. Just a short period of time in which, by way of example, the scanning beam crosses the recording or playback track on the recording medium during track skipping is sufficient for ascertaining the wobble frequency.

Another aspect of the present invention is the specification of a recording and/or playback appliance for carrying out the aforementioned methods. In accordance with this aspect of the invention, means are provided which are used to filter out the unmodulated wobble frequency or the fundamental frequency of wobbling, which is referred to in this case as the wobble frequency, from the wobble signal detected from the recording medium and to relate it to the rotation speed of the recording medium or to the wobble frequency at a known scanning location. The recording and/or playback appliance for recording media with a wobble track has a turntable for holding the recording medium, a drive apparatus for driving the recording medium at a rotation speed, an optical scanning device for recording and/or playing back information or data onto or from the recording medium, and contains a drive apparatus for moving the scanning device in the radial direction of the recording medium. In addition, there are a circuit arrangement for providing the wobble frequency of the recording medium rotating at the rotation speed and a microprocessor for calculating a current position for the scanning device or for the scanning location on the recording medium or for controlling moving of the scanning device.

In the case of a recording medium with a wobble track, such as a rewriteable DVD, which is also referred to as a DVD+RW, the wobbling of the track consists in a sinusoidal deviation from a nominal or symbolic centre line of a spiral track with a constant wavelength. The wobbling is phase-modulated with inverted wobble cycles, however, and therefore has sudden phase changes. The wobble track is provided in the form of a depression or elevation in or on the recording medium, and is generally used to control the write speed and to ascertain sector addresses on the recording medium. The wobble signal is recorded at a constant linear speed, and the wobble modulation contains information, stored in digital form, about the scanning location or the physical address, as specified in the ECMA standard for the DVD+RW, for example. To detect the scanning location, however, a plurality of wobble cycles need to be evaluated and decoded. The wobbling recorded at a constant linear speed and provided in the form of a preformed elevation or depression on the disc has a wavelength corresponding to 32 bit clock cycles, which means that the wobble frequency of a DVD+RW is 817.5 kHz at a single linear speed. By contrast, the frequency at which the information about the scanning location is available in an "ADIP word" is only 169.11 Hz at a single linear speed. Single linear speed means that the recording medium is driven at a higher rotation speed in the inner area than in the outer area. The comparison of the frequencies already shows that the evaluation of ADIP words is not suitable for detecting and generating information about a current scanning location during track skipping, since the scanning beam dwells over a track only for a very short period of time during skipping. While the number of tracks crossed in the area of the recording medium in which information is recorded in the recording or playback track is known to be able to be counted by low-pass filtering or evaluation of the data or information signal's envelope, this principle fundamentally cannot be used in the area in which no data or information is recorded. The wobble track is present both in recorded and in unrecorded areas on the disc, however.

The invention is based on the principle of using the wobble frequency detected from the disc to obtain information about the scanning location. This becomes possible because the scanned wobble frequency changes from the inside to the outside over the recording medium at a constant rotation speed. Standardized parameters or a known location are then used to determine or detect a recording or playback location. This principle can then be applied in the entire recording or playback area of the recording medium, irrespective of whether or not information has already been recorded.

The information about the scanning location is provided very quickly even during track skipping, since the wobble frequency for the DVD+RW is almost five thousand times higher than the frequency at which an ADIP word is available. In accordance with one embodiment, to detect or to select the wobble frequency from the wobble signal detected from the recording medium, a circuit arrangement is provided which comprises a bandpass filter with a phase locked loop. The wobble signal, which is also referred to as a push-pull signal, is provided using a four-quadrant detector and a summation amplifier and differential amplifier, in a known manner. This signal is then supplied to a phase comparator formed by an analogue multiplier, and the multiplier has a bandpass filter with a downstream voltage-controlled oscillator connected to it, the latter's output being connected to the input of a digital phase shifter in order to provide the comparison signal for the phase comparator. This advantageously prevents any phase shift fundamentally initiated by bandpass filters, and the output of the voltage-controlled oscillator produces a signal which contains the wobble frequency. The phase modulation of the wobble signal, which phase modulation represents a noise component of almost four percent in the case of the DVD+RW, is suppressed using the bandpass filter. The bandpass filter used is preferably an adjustable filter which is set approximately to the wobble frequency which can be expected. The wobble frequency to be expected is ascertained by comparative measurement or is known from prior ascertainment and by means of calculation in the case of intended changes in the rotation speed. Furthermore, means can be provided which are used to permit the phase locked loop to lock in the starting phase over a wide frequency range. These means can also be used as an indicator of the PLL's locking. The wobble frequency generated from the wobble signal in this manner, and which can also be used for generating and decoding information contained in the wobble signal, is then used in line with the methods specified above for ascertaining the scanning position or for moving the scanning position of a recording or playback head, referred to as scanning device, in the recording or playback appliance.

The aforementioned and other objects, features and advantages of the present invention are explained in more detail below in drawings using an exemplary embodiment of the invention.

Figure 2:
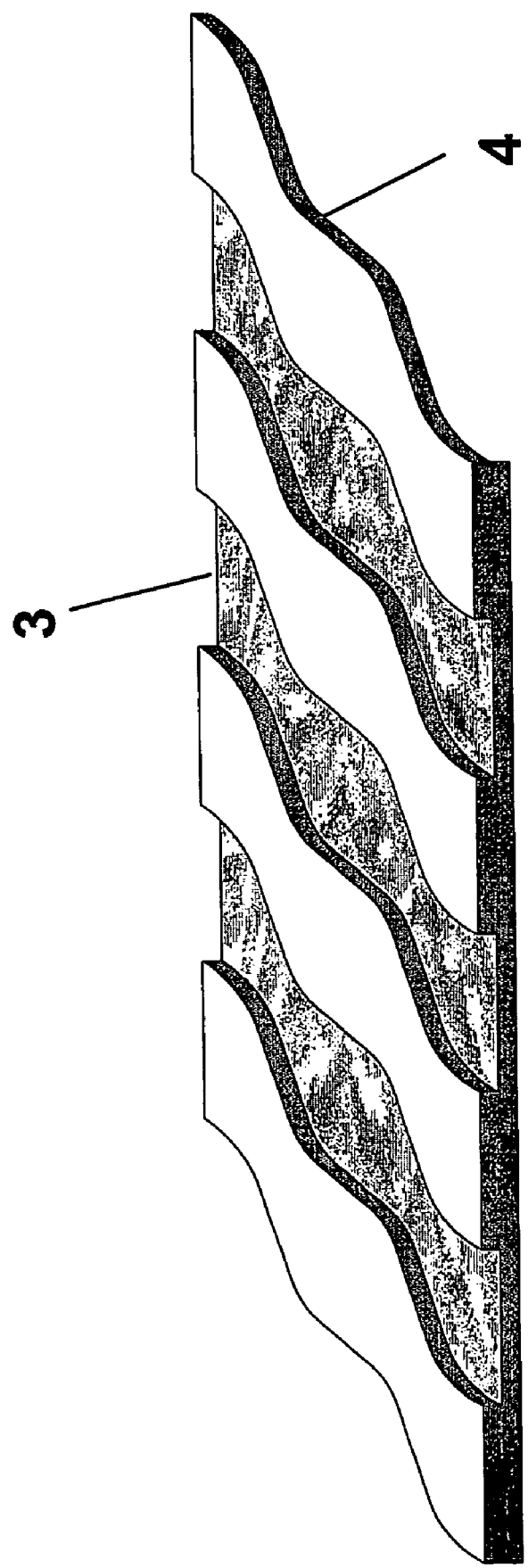
Figure 3:
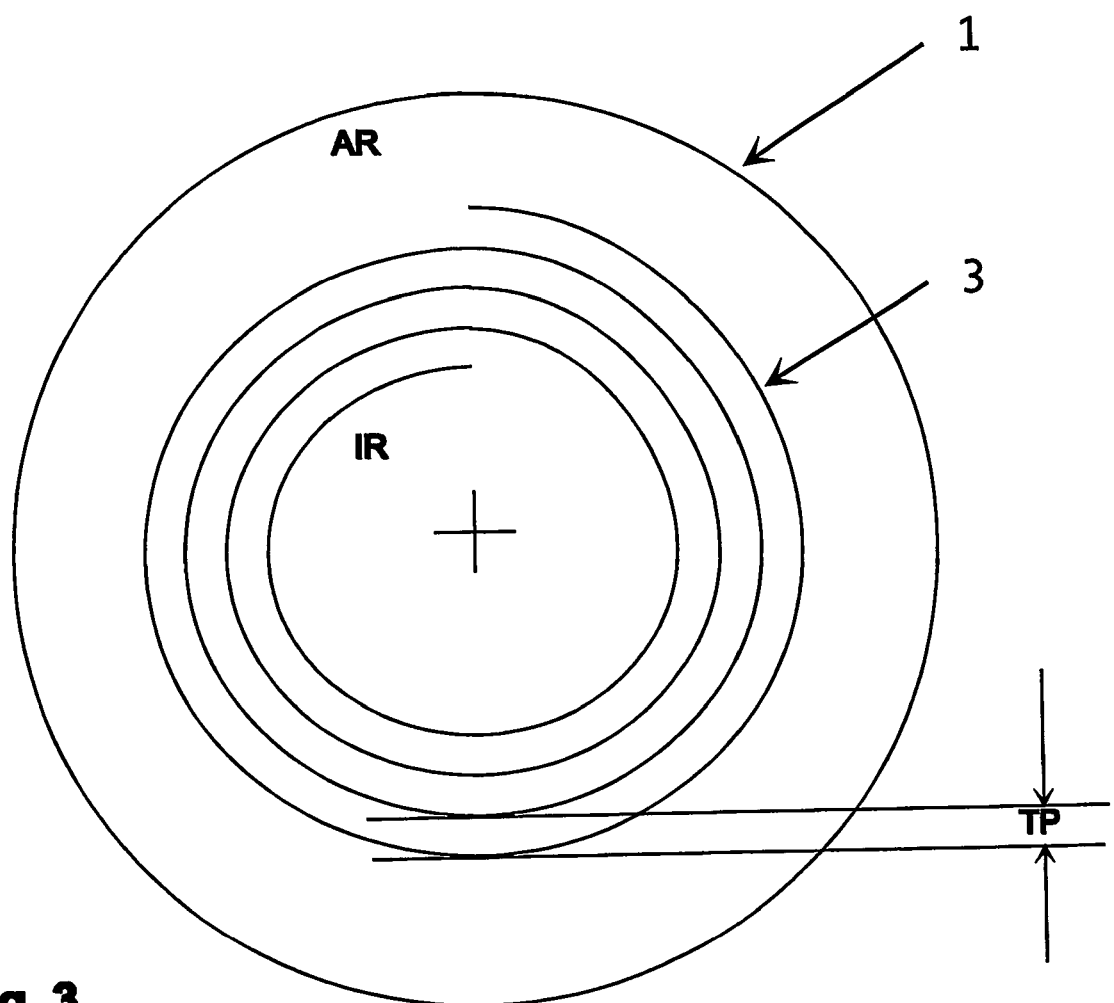
Figure 4:
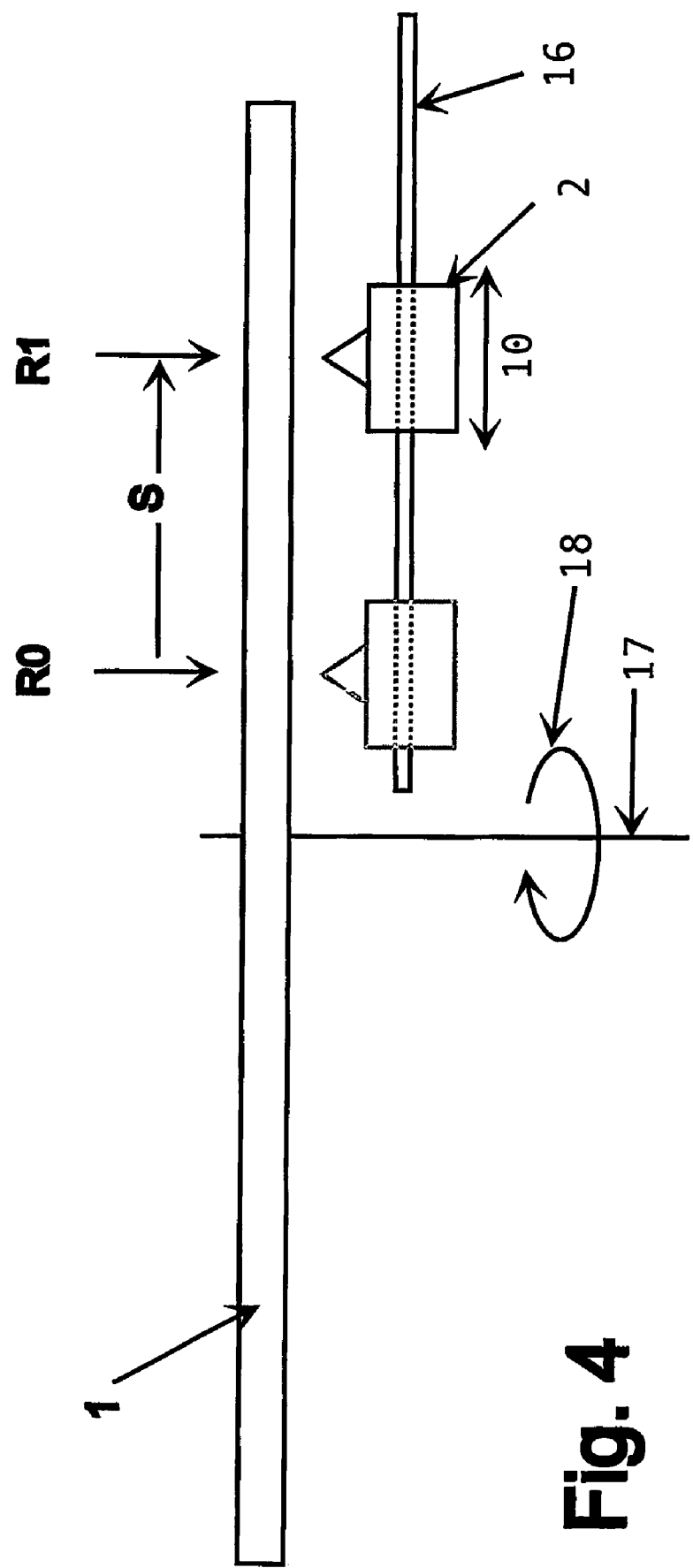
Figure 5:
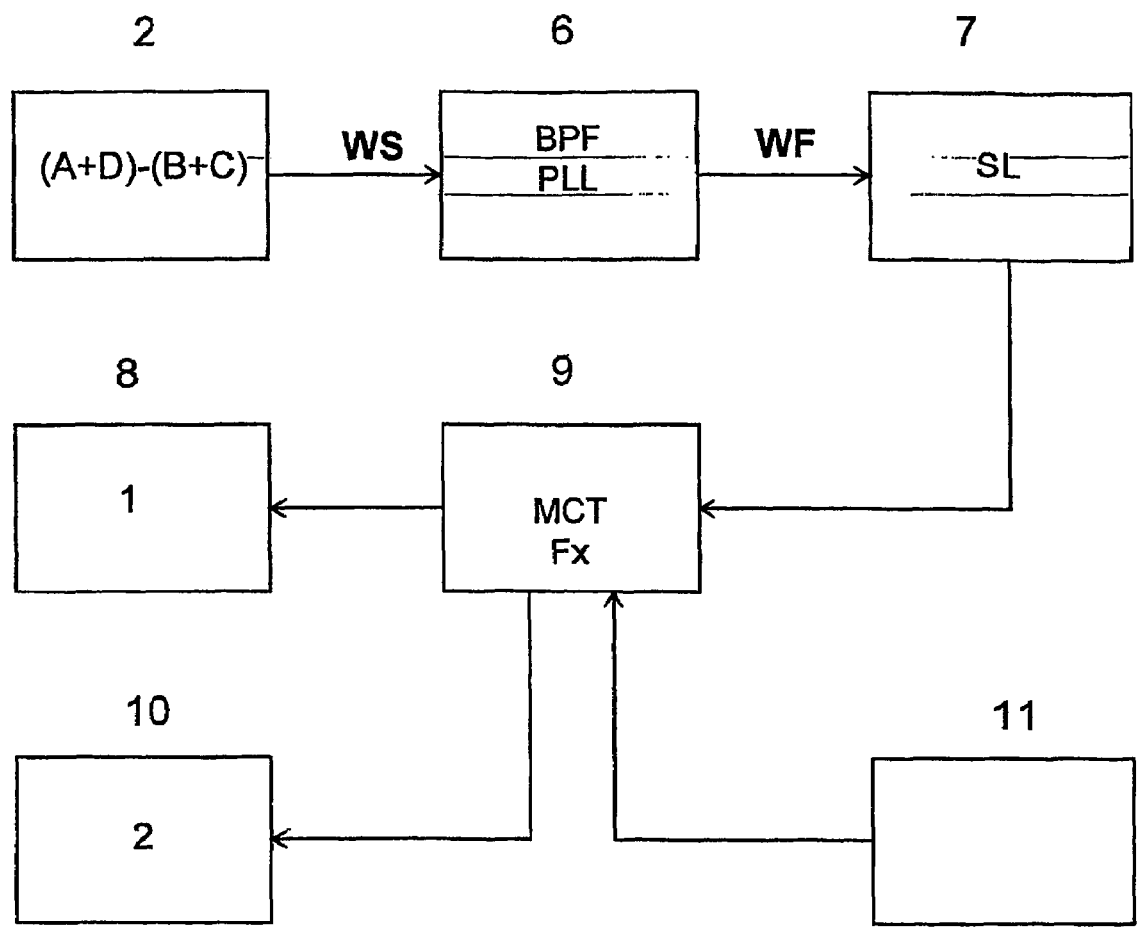
Figure 6:
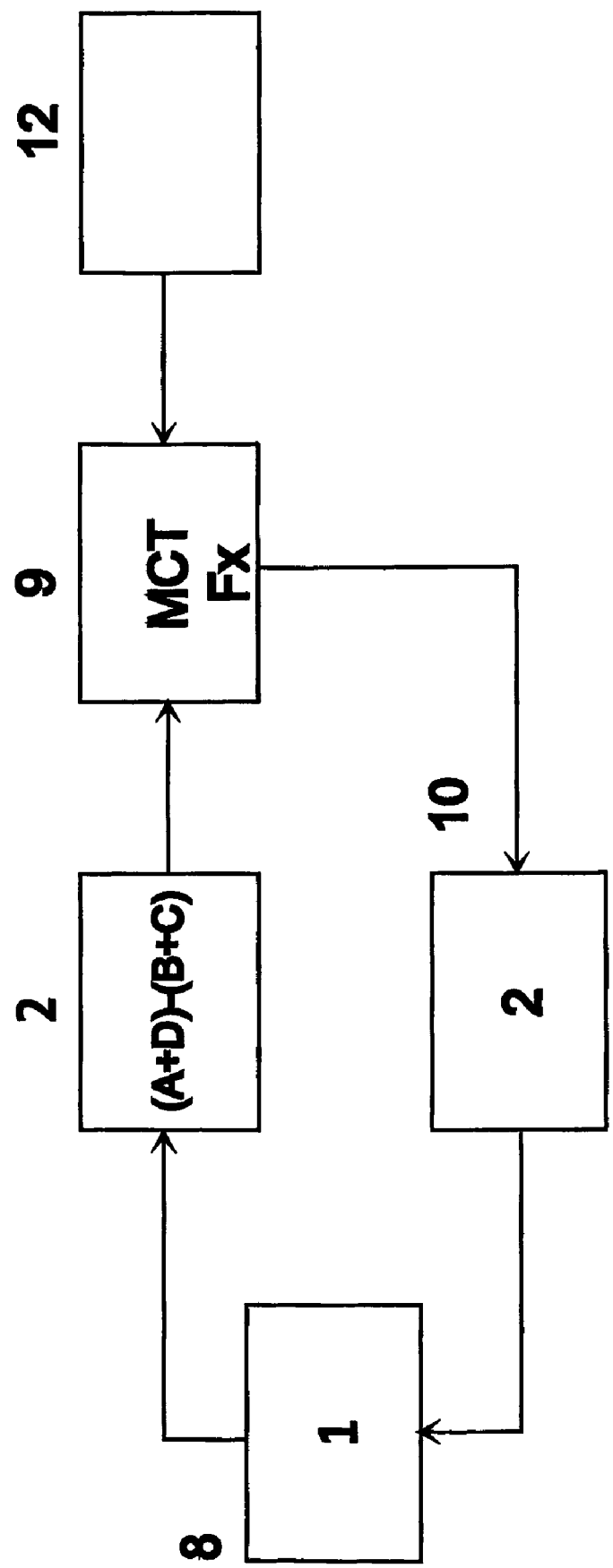
Figure 7:
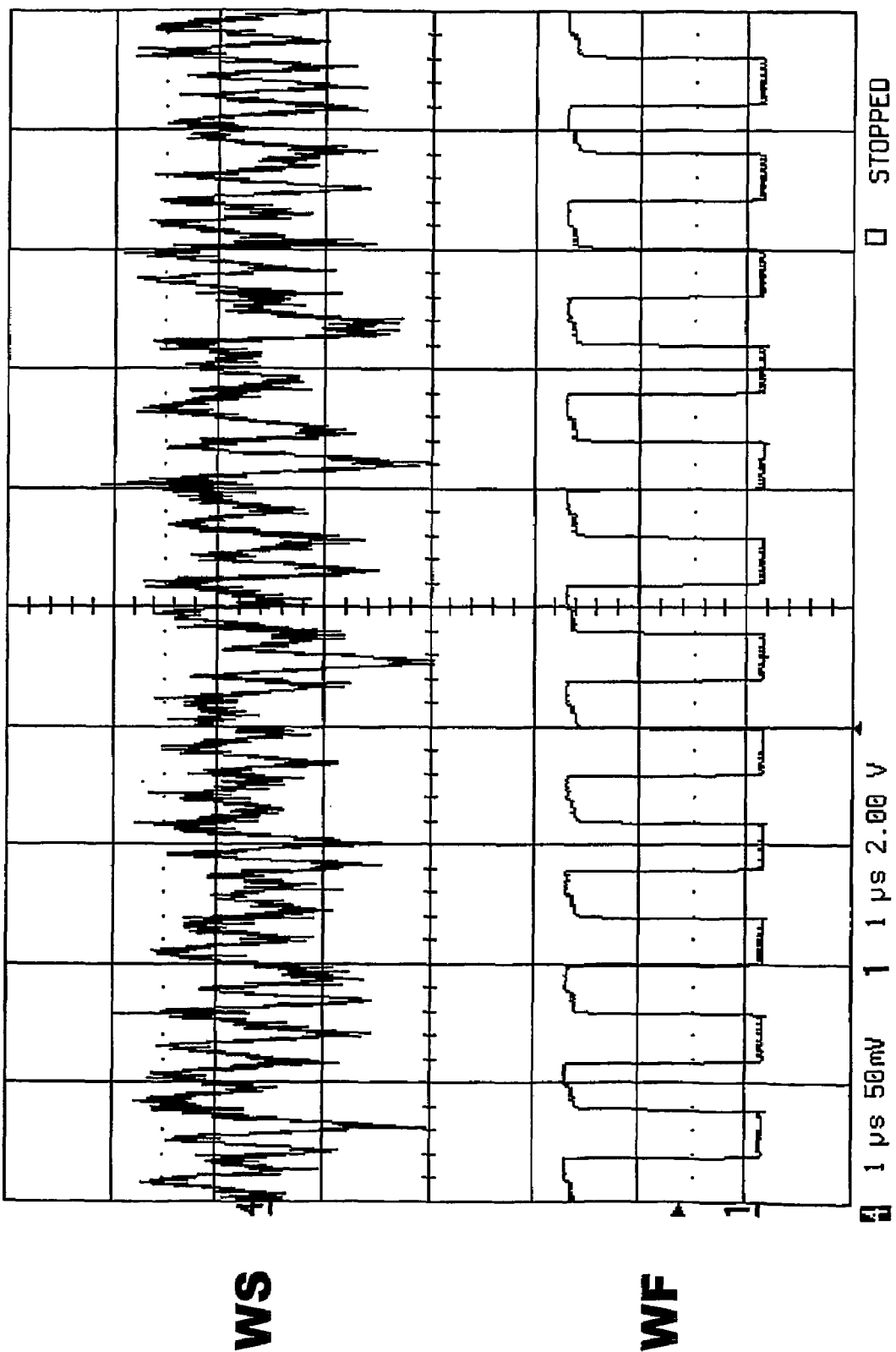
Figure 8:
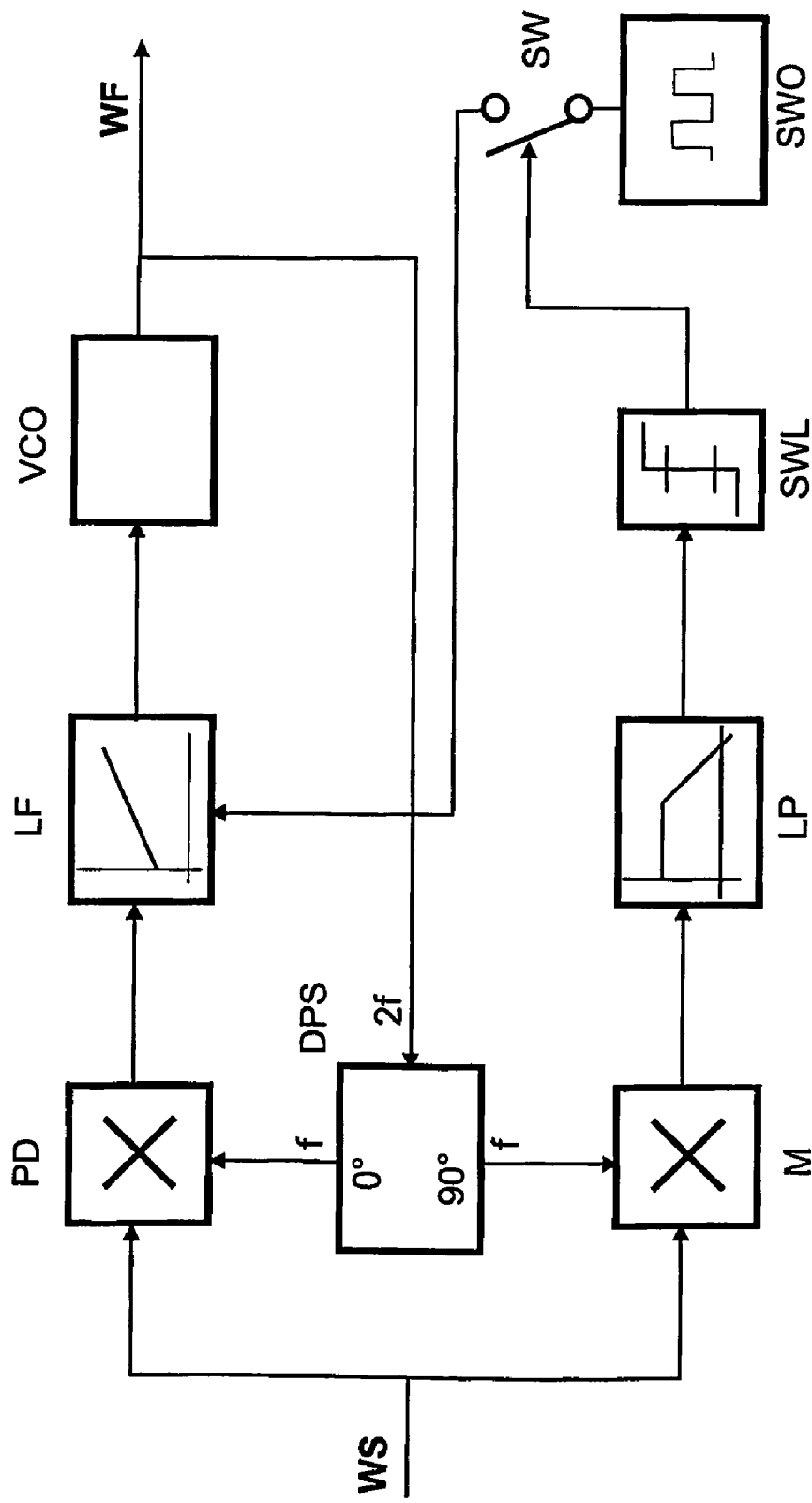

In the drawings:

FIG. 1 shows a schematic illustration of a greatly enlarged detail of a recording track on an optical recording medium in plan view, FIG. 2 shows a schematic illustration of a greatly enlarged detail of a recording track on an optical recording medium in cross-section, FIG. 3 shows a schematic illustration of the arrangement of a recording track on an optical recording medium, FIG. 4 shows a schematic illustration of the design of a recording and/or playback appliance based on an exemplary embodiment of the present invention, FIG. 5 shows a block diagram of the circuit arrangement for the recording and/or playback appliance from FIG. 4 for the purpose of position determination or for the purpose of positioning the optical scanning device, FIG. 6 shows a block diagram of a control loop for positioning the optical scanning device in the recording and/or playback appliance from FIG. 4, FIG. 7 shows signal graphs of the wobble signal and of the wobble frequency contained, and FIG. 8 shows a circuit arrangement for generating the wobble frequency from the scanned wobble signal.

The inventive arrangement and the inventive methods are intended for recording media with a wobble track, such as optical or magneto-optical discs, DVD+RWs or other write-once or rewriteable disc formats with a wobble track, called discs below for short. Although the invention is predominantly explained in connection with a DVD+RW below, this does not exclude its use for similar recording media with a wobble track, however.

Reference symbols are used largely concurrently in the drawings.

The design of a recording media with a wobble track is shown schematically in FIGS. 1 to 3, by way of example for a DVD+RW.

The DVD+RW is an optical recording medium in the form of a rewriteable disc based on ECMA standard ECMA/TC31. The ECMA standard also reveals further details of the recording medium.

As FIGS. 1 and 2 show, the DVD+RW has a wobble track which is formed by an elevation or depression with a sinusoidally running edge 4 on the disc 1. To illustrate that the wobble track is an elevation or depression on or in the disc 1, one side of the edge 4 in FIG. 1 is darker, and FIG. 2 shows a cross-section of the disc 1. The wobble track is produced on the recording medium during actual manufacture.

Data or information are/is recorded or stored on the disc 1 using "pits 5". The pits 5 have been or are arranged between the wobble tracks in a "trench" which forms the recording or playback track 3 on the recording medium. In the case of the DVD+RW, the pits 5 are produced in the recording or playback track 3 by means of partial heating using a laser beam, the laser beam bringing about a change in the reflectivity in the recording layer as a result of the transition from the amorphous state to the crystalline state, and vice versa.

The wobbling of the recording or playback track 3 is a continuous, sinusoidal deviation from the centre line of a spiral track storing information about the location on the disc 1 in the form of a phase-modulated data signal.

The wobble track is generally produced by stamping in the manufacturing process for the disc 1 and, in the case of the DVD+RW, has a wobble period WP or wavelength of approximately 4.2656 μm. Wobbling is used to control the rotation speed or number of revolutions of the disc 1, to control the write operation on the disc 1 and to stipulate sector addresses on the disc 1. In addition, the wobbling can contain additional digital information.

Information and addresses stored in the wobble track are also referred to as ADIP or address-in-pregroove. The wobble track is present on the disc 1 irrespective of the latter's unrecorded or recorded state and is recorded at a constant linear speed.

To scan a wobble signal WS corresponding to the wobble track, a photodetector in the form of a "push-pull" matrix is provided which comprises four quadrants and provides the signals A, B, C and D, which are then used in a known manner to generate a wobble signal WS, also referred to as a push-pull signal, by adding the signals A and D and also B and C from detectors arranged in the track direction and by subsequently forming the difference for the summed signals. A wobble signal WS detected accordingly by a DVD+RW is shown in FIG. 7 and reveals that it has a high proportion of noise, and means need to be provided for filtering out a wobble-frequency signal WF representing the wobble frequency Fx. It is not possible to use a bandpass filter, however, since bandpass filters fundamentally cause a phase shift, and the wobble-frequency signal WF representing the wobble frequency Fx advantageously also needs to be used as a bit clock signal for decoding the scanning-location information which is contained in the wobble signal WS. The text below gives a more detailed explanation of an exemplary embodiment of a recording and/or playback appliance and of methods which can be carried out using said appliance for the purpose of position determination and for the purpose of positioning or moving the optical scanning device based on the present invention.

The recording and/or playback appliance has a turntable for holding a disc 1 which is rotated about an axis 17 at a prescribed or adjustable rotation speed Fd using a drive apparatus (not shown in FIG. 4). This is shown in FIG. 4 with an arrow 18. For the purpose of recording and/or playing back information, an optical scanning device 2 is provided. In the case of the DVD+RW, information is recorded and/or played back using a laser beam produced by the scanning device 2. A drive apparatus 10 can be used to move the scanning device 2 along a guide 16 in the radial direction with respect to the disc 1, and said scanning device generally has a fine-adjustment drive which can be used for additionally moving the laser beam in a plane parallel to the disc 1 within a prescribed range. The current position of the optical scanning device 2 in the radial direction is denoted by R1, while a reference position for the optical scanning device 2, for example defined by the inner radius IR of the recording or playback track 3, is denoted by R0. The radial distance between these two positions R0 and R1 is identified by S. To ascertain the current position of the optical scanning device 2 or to move the optical scanning device 2 to a desired scanning or recording location even in an area of the disc 1 in which no data or information are/is yet stored, the invention involves the use of a wobble frequency Fx which is contained in the wobble signal WS detected from the disc. To this end, in line with the block diagram shown in FIG. 5, the wobble signal WS detected using the optical scanning device 2 is supplied to a circuit arrangement 6 which, on account of the low signal-to-noise ratio, needs to perform very efficient filtering of the wobble signal WS shown in FIG. 7. In accordance with this exemplary embodiment, a bandpass filter BPF having a phase locked loop PLL is provided which combines the advantages of a narrow filter with the possible adjustment of the filter frequency, so that the phase locked loop PLL can follow the actual frequency very precisely. The wobble-frequency signal WF provided by the circuit arrangement 6 represents the wobble frequency Fx of the wobble signal WS and, if required, following further signal conditioning using an edge detector SL in the block 7, is supplied to a microcontroller MCT represented as a block 9. In the microcontroller MCT, a clock generator is used to ascertain the wobble frequency Fx of the wobble signal WS from the wobble-frequency signal WF, and said wobble frequency Fx is then, as explained later, used for calculating the current position R1 or for moving the scanning device 2.

The microcontroller MCT provided in the block 9 is also connected to a drive apparatus 8 for the disc 1 and to the drive apparatus 10 for the optical scanning device 2. In addition, a limit switch 11 can also be connected to the microcontroller MCT, said limit switch being used to limit the possible range of movement of the optical scanning device 2. The limit switch 11 is, by way of example, arranged at a position corresponding to the inner radius IR of the recording or playback track 3 and thus defines a possible reference position R0 for the optical scanning device 2. However, the reference position R0 used can also be that position of the optical scanning device 2 which corresponds to the outer radius AR of the recording or playback track 3. Furthermore, any other absolute position of the scanning device 2 which has previously been determined using one of the methods indicated below can also be used as reference position R0 for moving the scanning device 2 to a desired scanning or writing position.

Since the wobble signal WS is provided on the disc 1 at a constant linear speed, the wobble frequency Fx of the scanned wobble signal WS changes on the basis of the radial position R1 of the scanning device 2. The detected wobble frequency Fx is then used at a known rotation speed Fd, indicated as a number of revolutions per unit time, to calculate the current position R1 or the radius on the disc 1 at which the scanning device 2 is situated. To this end, the wobble frequency Fx is related to the rotation speed of the recording medium using a constant factor. The current position R1 of the scanning device 2 then corresponds to the following equation:

$$R1 = \frac{Fx \times WP}{2 \times \pi \times Fd} \quad (1)$$

where R1 is the current position R1, WP is the length of a wobble period WP or the wavelength of the wobble track on the disc 1, Fd is the rotation speed Fd as the rotation speed of the disc 1, and Fx is the wobble frequency Fx measured at the current position R1. The rotation speed Fd or the number of revolutions of the disc 1 can either be prescribed as a rotation speed using the microcontroller MCT or can be determined using a rotation-speed measurement device. To prescribe a particular rotation speed, the microcontroller MCT actuates, by way of example, a frequency generator which then uses the drive apparatus 8 to drive the disc 1 at the prescribed rotation speed. Since the wobbling is provided not just in the already recorded areas of a disc 1, but also in the areas thereof which have not yet been recorded, the use of the wobble frequency Fx makes it possible to ascertain any desired position of the scanning device 2 on the disc 1. In addition, this method does not involve determining a relative position, but rather the current absolute position R1 of the scanning device 2.

Provided that a reference position R0 for the scanning device 2 is already known, which has been ascertained using the aforementioned method or, by way of example, has been determined by means of a position R0 on the disc 1 which corresponds to the inner radius IR, the equation below is used to calculate the wobble frequency Fx which can be expected at the location on the disc 1 to which the scanning device 2 needs to be moved.

$$Fx = \frac{2 \times \pi \times Fd(R0 + S)}{WP} \quad (2)$$

The scanning device 2 therefore needs to be moved until a wobble frequency Fx corresponding to the radial distance S with respect to the position R0 or a wobble frequency Fx corresponding to the position R1 is detected in the wobble signal WS. The number N of tracks which has been crossed from the reference position R0 to the position R1 is then $$N = \frac{(Fx + WP) - (2 \times \pi \times Fd \times R0)}{2 \times \pi \times Fd \times TP}, \quad (3)$$

when a track distance TP as shown in FIG. 3 is taken as a basis, which means that it is also possible to calculate a wobble frequency Fx which needs to be measured in order to skip over a prescribed number N of tracks.

It will be noted that the aforementioned calculations can also be performed for changing rotation speeds Fd or for changing numbers of revolutions of the disc 1, taking into account the ratio between rotation speed Fd and wobble frequency Fx.

To carry out the aforementioned methods, the current wobble frequency Fx of the rotating disc 1 needs to be made available from the wobble signal WS detected from the disc 1. To this end, FIG. 8 indicates a circuit arrangement which provides a more detailed description of the circuit block 6 shown in FIG. 5. The circuit arrangement is used to provide a wobble-frequency signal WF containing the wobble frequency Fx. A comparison of the wobble signal WS shown in FIG. 7 with the wobble-frequency signal WF likewise shown in FIG. 7 shows that the low signal-to-noise ratio means that very efficient filtering of the wobble signal WS is required, but this cannot be done by a conventional bandpass filter on account of the phase shift which is inherent in bandpass filters.

The invention provides a circuit arrangement as indicated in FIG. 8, to which the wobble signal WS detected from the disc 1 using the photodetector in the scanning device 2 is supplied. The circuit arrangement comprises a multiplier which acts as a phase comparator PD on account of the wobble signal WS and a frequency signal f preferably generated using a digital phase shifter DPS being supplied to the phase comparator PD. In the phase comparator PD, the wobble signal WS and a frequency signal f preferably generated using a digital phase shifter DPS are multiplied and are supplied to a bandpass filter LF. The bandpass filter LF used is preferably an adjustable bandpass filter LF whose output signal drives a voltage-controlled multivibrator VCO. In line with its input signal, the voltage-controlled multivibrator VCO provides an output signal which preferably has twice the frequency of the frequency signal 2f which is supplied to the phase comparator PD. The output signal from the voltage-controlled multivibrator VCO, which is simultaneously the wobble-frequency signal WF generated using the circuit arrangement, is supplied to the digital phase shifter DPS. The circuit arrangement formed in this way then represents a bandpass filter BPF with a phase locked loop PLL. The inventive circuit arrangement, which requires a small number of assemblies, advantageously combines the advantages of a narrow filter with the possible adjustment of the filter frequency, so that the phase locked loop formed in this manner can follow the actual frequency very precisely.

FIG. 8 indicates additional means whose use is expedient when the phase locked loop needs to be used for a wide rotation-speed range for the disc 1 and for correspondingly large changes in the frequency of the wobble signal WS. These means are used to widen the capture range of the phase locked loop. It would be possible to dispense with them when using a constant rotation speed for the disc 1, since the dimensions of the disc 1 mean that changes in the wobble frequency Fx which exceed the factor 2.7 are not to be expected at a constant rotation speed. However, to be able to detect a wobble frequency Fx in the actual starting phase or when the disc 1 accelerates from a standstill to the rated rotation speed, the use of means for extending the capture range is considered to be advantageous. These means for extending the capture range are, as FIG. 8 shows, a second multiplier M, a low-pass filter LP with a downstream threshold value detector SWL, and a sweep or control oscillator SWO used to sweep through the filter range of the bandpass filter LF. The second multiplier M likewise has the wobble signal WS and a signal from the digital phase shifter DPS supplied to it. The signal from the digital phase shifter DPS which is supplied to the second multiplier M is phase-shifted through 90° with respect to the signal which is supplied to the phase comparator PD, however. When there is a large difference between the frequency in the wobble signal WF and the frequency of the phase locked loop, this ensures that the frequency range of the phase locked loop is swept through and locks onto the frequency contained dominantly in the wobble signal WS. To this end, the threshold value detector SWL controls a switch SW which connects the sweep or control oscillator SWO to the control input of the bandpass filter LF.

This ensures that a wobble-frequency signal WF required for ascertaining the wobble frequency Fx and for detecting or moving the position of the scanning device 2 is provided reliably and with little complexity.

The circuit arrangement for detecting the wobble frequency Fx may have an edge detector SL connected downstream of it in order to simplify evaluation of the wobble frequency Fx. The wobble frequency Fx is ascertained, by way of example, by comparing the period of the wobble-frequency signal WF with a clock generator signal.

In an appliance for recording or playing back data or information in which a recording medium with a wobble track, such as the disc 1, is used, the wobble frequency Fx contained in the detected wobble signal WF is then advantageously used for detecting or moving the position of the scanning device 2. To this end, the circuit block 6 shown separately in the block diagram in FIG. 5 and the edge detector SL in the block 7 can also be provided as a block 9 integrated in the microcontroller MCT. Particularly for the purpose of moving the scanning device 2 to a desired playback or recording location in the recorded or unrecorded area of the disc 1, a control loop shown in FIG. 6 is provided. This control loop comprises a setpoint device 12 which provides information or data about the desired playback or recording location, said information or data being prescribed by a user of the appliance or by the program in another control unit in the appliance for recording or playing back information. This information or data about the desired playback or recording location is/are supplied to a microcontroller MCT (shown in the block 9 in FIG. 6) which is used to move towards an absolute position R1 or a position R1 corresponding to the prescribed radius of the disc 1 in line with one of the aforementioned methods, or to calculate a radial distance S which needs to be crossed in order to reach the desired position R1. First, irrespective of the way in which the desired position R1 is ascertained, the drive apparatus 10 for the scanning device 2 is supplied by the microcontroller MCT with a control signal which is required for reaching the desired position R1. However, since changes in the rotation speed of the disc 1 bring about a change in the wobble frequency Fx which can be expected at the desired position R1, a control loop is provided which takes into account changes in the rotation speed of the disc 1. In line with FIG. 6, the drive apparatus 8 for the disc 1 is incorporated into the control loop in this regard. This advantageously results in the destination being reached with a high degree of accuracy despite a changing wobble frequency Fx used for detecting or for characterizing the destination. A nominal wobble frequency used as a comparison variable for reaching the desired position R1 is changed by the microcontroller MCT in line with prescribed or detected changes in the rotation speed of the disc 1. On the basis of the comparison of the adapted nominal wobble frequency with the wobble frequency Fx detected from the disc 1, the microcontroller MCT is then used to derive further control signals for moving the scanning device 2 to the desired position R1.

On account of a relatively high wobble frequency Fx, which in the case of the DVD+RW is already approximately 820 kHz at the single DVD speed, the reaction time in the control loop is very short. This means that the inventive method allows very fast and accurate positioning of the scanning device 2 at a desired location.

The scanning device 2 also detects a wobble signal WS during track skipping, when the scanning device 2 dwells over the wobble track for only a short period of time, which means that it is also possible to record the wobble signal WS and to detect the scanning location during a search operation, i.e. while the scanning device 2 is being moved. Since it is not necessary to stop the scanning device 2 in order to detect the current position R1 of the scanning device 2, the positioning operation is speeded up significantly.

As already mentioned above, the advantages of the present invention are very fast and accurate position determination for the optical scanning device 2, which means that it is also possible to implement applications requiring very fast and/or expansive track skips. Determination of the current scanning location of the scanning device 2 is made possible without decoding of addresses stored in the recording track and without counting tracks which have been skipped. Position determination can also be performed during the search operation, and results in the search operations being shortened. Detection of the absolute position of the scanning device 2 is made possible, specifically both in unrecorded areas and in the recorded areas of a disc 1.

The embodiments described here are given merely as examples, and a person skilled in the art can implement other embodiments of the invention which are within the scope of the invention.

The invention claimed is:

1. Appliance for recording or playing back information having means for detecting or moving the scanning location on a disc with a wobble track providing a wobble signal recorded at a constant linear speed in the wobble track on the disc with a predetermined wavelength of said wobble track, said disc is scanned at a predetermined number of revolutions per time unit of the disc using a scanning device, and a wobble frequency contained in said wobble signal detected from said disc is used for detecting or moving the position of said scanning device, wherein the move of the location of the scanning device to a location on the disc to be scanned by the scanning device is performed by using a ratio between the wobble frequency detected with the scanning device from the disc and the number of revolutions or rotation speed of the disc in that the wobble frequency expected at the location on the disc to be scanned by the scanning device is calculated for said number of revolutions or rotation speed of the disc and the scanning device is moved to the location where the calculated wobble frequency being detected from the disc with the scanning device.

2. Appliance according to claim 1, wherein the position of the scanning device is moved by filtering out a wobble frequency contained in the wobble signal detected from the disc, which is different to the wobble frequency at constant linear speed with a band pass filter.

3. Appliance according to claim 1, wherein an absolute location on the disc scanned by the scanning device on the disc, which is determined as the radius of the disc, is determined by comparing a wobble frequency detected from the disc to a rotation speed for the disc which is predetermined for the disc by using a microcontroller.

4. Appliance according to claim 3, wherein the predetermined rotation speed used for the disc is controlled by a control signal generated by the microcontroller in order to drive the disc in rotation.

5. Appliance according to claim 3, wherein the predetermined rotation speed used for the disc is a rotation speed for the disc which is ascertained using a rotation-speed detector.

6. Appliance according to claim 1, wherein the scanning device is positioned for scanning the disc at a desired radial position on the disc by using a microcontroller, which calculates a wobble frequency which can be expected at the desired radial position at the predetermined rotation speed for the disc and by moving the scanning device using a control signal generated by the microcontroller until a match is achieved between a wobble frequency detected from the disc and the expected wobble frequency.

7. Appliance according to claim 1, wherein the scanning device is moved to a desired radial scanning position on the disc by using a wobble frequency detected at a reference position to calculate a wobble frequency which can be expected at the desired radial position using a microcontroller.

8. Appliance according to claim 1, wherein a distance of the scanning device or a number of tracks between a reference position and a current location of the scanning device is calculated by using a microcontroller using the wobble frequency of the recording or playback track on the disc.

9. Appliance according to claim 4, wherein the control signal generated by the microcontroller is used to actuate a frequency generator used to generate the predetermined rotation speed for the disc.

10. Appliance according to claim 1, wherein a limit switch is provided for limiting the range of movement of the scanning device in radial direction of the disc, said limit switch forming a reference location for a wobble frequency is to be detected or which shall be adjusted with a control loop by changing the rotation speed of the disc.

* * * * *